United States Patent
He et al.

(10) Patent No.: US 11,417,877 B1
(45) Date of Patent: Aug. 16, 2022

(54) CARBON QUANTUM DOT/CARBON COATED $VSE_2$ COMPOSITE MATERIAL ($VSE_2$@CQD) FOR POTASSIUM ION BATTERY AND PREPARATION METHOD THEREOF

(71) Applicant: GUANGDONG UNIVERSITY OF TECHNOLOGY, Guangzhou (CN)

(72) Inventors: Miao He, Guangzhou (CN); Yefeng Feng, Guangzhou (CN); Chenhao Xu, Guangzhou (CN); Kaidan Wu, Guangzhou (CN); Deping Xiong, Guangzhou (CN)

(*) Notice: Subject to any disclaimer, the term of this patent is extended or adjusted under 35 U.S.C. 154(b) by 9 days.

(21) Appl. No.: 17/230,010

(22) Filed: Apr. 14, 2021

(51) Int. Cl.
*H01M 4/58* (2010.01)
*H01M 4/36* (2006.01)
*H01M 4/133* (2010.01)
*H01M 4/1393* (2010.01)
*H01M 4/587* (2010.01)
*C01B 19/00* (2006.01)
*H01M 10/054* (2010.01)

(52) U.S. Cl.
CPC .......... *H01M 4/366* (2013.01); *C01B 19/007* (2013.01); *H01M 4/133* (2013.01); *H01M 4/1393* (2013.01); *H01M 4/581* (2013.01); *H01M 4/587* (2013.01); *H01M 10/054* (2013.01)

(58) Field of Classification Search
CPC ................................................ H01M 10/054
See application file for complete search history.

(56) References Cited

U.S. PATENT DOCUMENTS

| 10,243,211 B2 | 3/2019 | Tan et al. |
| 2016/0028086 A1 | 1/2016 | Vail et al. |
| 2017/0110719 A1 | 4/2017 | Wang et al. |

FOREIGN PATENT DOCUMENTS

| CN | 108390042 A | 8/2018 |
| CN | 110190255 A | 8/2019 |

OTHER PUBLICATIONS

"Metallic Graphene-like VSe2 Ultrathin Nanosheets: Superior Potassium-Ion Storage and Their Working Mechanism" (2018).*

* cited by examiner

*Primary Examiner* — Austin Murata

(57) ABSTRACT

The present invention relates to a preparation method of a carbon quantum dot/carbon coated $VSe_2$ composite material ($VSe_2$@CQD), and belongs to the technical field of electrode material of a potassium ion battery and preparation thereof. By compositing the carbon, carbon quantum dots and vanadium diselenide ($VSe_2$), the three components generate a synergistic effect. The carbon quantum dot/ carbon coating can improve the electronic conductivity and lithium ion diffusion rate of the material, and also can inhibit the agglomeration of the vanadium diselenide ($VSe_2$). Therefore, the prepared carbon quantum dot/carbon coated $VSe_2$ composite material ($VSe_2$@CQD) has excellent electrochemical performance and excellent rate performance and cycle stability. The method is simple in process, low in cost, environment-friendly, and suitable for large-scale industrial production.

12 Claims, 10 Drawing Sheets

CARBON QUANTUM DOT/CARBON COATED VSE$_2$ COMPOSITE MATERIAL (VSE$_2$@CQD) FOR POTASSIUM ION BATTERY AND PREPARATION METHOD THEREOF

TECHNICAL FIELD

The present invention relates to the technical field of manufacture of a potassium ion battery, and particularly relates to a carbon quantum dot/carbon coated VSe$_2$ composite material (VSe$_2$@CQD) and a preparation method thereof.

BACKGROUND OF THE PRESENT INVENTION

Lithium-ion batteries have the advantages of high open-circuit voltage, long cycle life, high energy density, no memory effect, etc., so that the lithium-ion batteries are widely used in the fields of portable digital products, electric vehicles and energy storage. However, due to the shortcomings of low lithium storage in nature, high price and the like at present, the further development of the lithium-ion batteries in the fields of the electric vehicles and large-scale energy storage is limited. Metal potassium has abundant reserves and low price in nature, thereby becoming an ideal material for substituting the lithium. In order to meet the sustainable demand of people for the high energy density potassium ion batteries, improving the specific capacity and cycle stability of negative materials of the potassium ion batteries has become an important research direction of the potassium ion batteries.

As a typical graphene-like interlayer transition metal selenide, vanadium diselenide has attracted wide attention in tribology, energy, electronic devices, optoelectronics and other fields because of the unique and excellent electrical, thermal and mechanical properties. In recent years, as the negative material of the lithium ion battery, the vanadium diselenide has already aroused the interest of researchers. As the negative material of the potassium ion battery, the vanadium diselenide has the advantages of moderate potassium insertion voltage (about 1.3 V), good safety, high specific capacity, etc. However, because the vanadium diselenide has poor conductivity and is easy to be re-stacked, the good electrical connection and lithium ion path in the cycle process may be lost, which eventually leads to the rapid decline of the capacity in the cycle process. In order to solve this problem well, it is a very effective method to prepare vanadium diselenide composite materials. Therefore, the composite materials of vanadium diselenide and amorphous carbon as well as carbon nanotubes and graphene have been synthesized and applied to the negative materials of potassium ion batteries, and their electrochemical properties have been greatly improved. In addition, because vanadium diselenide has great mechanical strength, some researchers believe that the vanadium diselenide can inhibit the volume expansion of other negative materials during charging and discharging. Therefore, the composite materials of vanadium diselenide, metal negative electrodes and transition metal oxides have also attracted the attention of the researchers.

SUMMARY OF THE PRESENT INVENTION

The technical problem to be solved by the present invention is to provide a carbon quantum dot/carbon coated VSe$_2$ composite material (VSe$_2$@CQD) and a preparation method thereof. The method is simple and easy in operation, effectively improves the electronic conductivity of VSe$_2$, improves the rate performance of the material, simultaneously inhibits the volume expansion and agglomeration of VSe$_2$, and improves the cycle stability of the material.

In the carbon quantum dot/carbon coated VSe$_2$ composite material and the preparation method thereof disclosed by the present invention, the carbon quantum dot/carbon coated VSe$_2$ composite material is prepared by combining a hydrothermal method and a high-temperature pyrolysis method. The mass fraction of VSe$_2$ in carbon quantum dot/carbon coated VSe$_2$ composite material is 60%-70%, and the mass fraction of carbon quantum dots/carbon is 30%-40%. Steps are as follows:

1). Weighing vanadium oxide and selenium oxide, dissolving in water or organic solvent to prepare a solution with a concentration of 0.5-2 mol/L, and stirring for 0.5 h to obtain a brownish gray solution;

2). Adding organic acid into the salt solution obtained in the step 1), and continuously stirring for 0.5 h to obtain a mixed solution;

3). Transferring the mixed solution obtained in the step 2) into a polytetrafluoroethylene lined high-pressure hydrothermal reaction kettle, and keeping the temperature at 150-220° C. for 15-30 h;

4). After the solution obtained in the step 3) is cooled, repeatedly centrifuging the solution with deionized water and absolute ethyl alcohol at a rate of 5,000-10,000 r/m, and removing the solution to obtain black precipitates;

5). Drying the black precipitates obtained in the step 4) at 50-120° C. for 12-24 h to obtain black powder;

6). Washing an organic compound cellulose acetate butyrate in an alkaline mixed solution and filtering for 3-5 times at a low temperature of −20 to 0° C., and washing the filtered white precipitates with water and absolute ethyl alcohol for 3-5 times until the solution is neutral;

7). Drying the white precipitates obtained in the step 6) at 50-100° C. for 12-24 h to obtain white powder;

8). Weighing the black powder obtained in the step 5) and the white powder obtained in the step 6) in a mass ratio of 1:(3-10), dissolving the powder in organic solvent, and stirring for 12-24 h;

9). Drying the solution obtained in the step 8) at 50-120° C. for 12-24 h to obtain brown colloid;

10). Heating the brown colloid obtained in the step 9) from 25° C. to 180-250° C. at 1-5° C./min in an inert atmosphere, keeping the temperature for 1-5 h, then heating to 600-950° C. at 1-5° C./min, keeping the temperature for 2-5 h, and naturally cooling to the room temperature to obtain the carbon quantum dot/carbon coated VSe$_2$ composite material (VSe$_2$@CQD).

In the above method,

In the step 1), the vanadium oxide is vanadium dioxide; the selenium oxide is selenium dioxide; and the solvent is one of deionized water or N-methyl pyrrolidone;

In the step 2), the organic acid is formic acid;

In the step 3), the keeping temperature is preferably controlled at 180-220° C., and the temperature keeping time is preferably controlled at 20-28 h;

In the step 4), the centrifuging rate is preferably controlled at 8,000-10,000 r/m;

In the step 5), the drying temperature is preferably controlled at 80-100° C., and the temperature keeping time is preferably controlled at 18-24 h;

In the step 6), the alkaline mixed solution is a 5-10% sodium hydroxide/8-15% urea mixed aqueous solution, and the temperature is preferably controlled at −20 to −15° C.;

In the step 7), the drying temperature is preferably controlled at 80-100° C., and the temperature keeping time is preferably controlled at 18-24 h;

In the step 8), a mass ratio of the black powder obtained in the step 5) to the white powder obtained in the step 6) is preferably controlled at 1:(4-8), the organic solvent is preferably N-methyl pyrrolidone, and the stirring time is preferably 20-24 h;

In the step 9), the drying temperature is preferably controlled at 80-100° C., and the temperature keeping time is preferably controlled at 18-24 h;

In the step 10), the inert atmosphere is one or more of nitrogen or argon and preferably argon; the heating rate is preferably 5° C./min, the first keeping temperature is preferably 200-220° C., and the temperature keeping time is preferably 2-3 h; the second keeping temperature is preferably 700-800° C., and the temperature keeping time is preferably 2-3 h;

The carbon quantum dot/carbon coated $VSe_2$ composite material is prepared through the above method and used as a negative material of a potassium ion battery and abbreviated as carbon quantum dot/carbon coated $VSe_2$ ($VSe_2$@CQD).

The carbon quantum dot/carbon coated $VSe_2$ ($VSe_2$@CQD) of the present invention has excellent rate performance and cycle stability. The three components, i.e. the carbon quantum dots, the vanadium diselenide and the carbon, generate a synergistic effect to effectively inhibit the agglomeration of the vanadium diselenide, and to simultaneously improve the electronic conductivity and lithium ion diffusion rate, thereby effectively improving the rate performance and cycle stability of the material.

DETAILED DESCRIPTION OF PREFERRED EMBODIMENTS

A carbon quantum dot/carbon coated $VSe_2$ composite material ($VSe_2$@CQD) is taken as specific embodiments to further describe the present invention below, but the present invention is not limited to these embodiments.

Embodiment 1

1). Vanadium dioxide and selenium dioxide are weighed and dissolved in N-methyl pyrrolidone solvent to prepare a solution with a concentration of 1 mol/L, and the solution is stirred for 0.5 h to obtain a brownish gray solution;

2). Formic acid is added into the salt solution obtained in the step 1), and continuously stirred for 0.5 h to obtain a mixed solution;

3). The mixed solution obtained in the step 2) is transferred into a polytetrafluoroethylene lined high-pressure hydrothermal reaction kettle, and the temperature is kept at 200° C. for 24 h;

4). After the solution obtained in the step 3) is cooled, the solution is centrifuged repeatedly with deionized water and absolute ethyl alcohol at a rate of 10,000 r/m, and the solution is removed to obtain black precipitates;

5). The black precipitates obtained in the step 4) are dried at 80° C. for 24 h to obtain black powder;

6). An organic compound cellulose acetate butyrate is washed in an alkaline mixed solution and filtered for 3 times at a low temperature of −15° C., and filtered white precipitates are washed with water and absolute ethyl alcohol for 3 times until the solution is neutral;

7). The white precipitates obtained in the step 6) are dried at 80° C. for 24 h to obtain white powder;

8). The black powder obtained in the step 5) and the white powder obtained in the step 6) are weighed in a mass ratio of 1:6, and the powder is dissolved in organic solvent, and stirred for 24 h;

9). The solution obtained in the step 8) is dried at 100° C. for 24 h to obtain brown colloid;

10). The brown colloid obtained in the step 9) is heated from 25° C. to 210° C. at 5° C./min in an inert atmosphere, the temperature is kept for 2 h, then the temperature increases to 700° C. at 5° C./min to be kept for 2 h, and the colloid is naturally cooled to the room temperature to obtain the carbon quantum dot/carbon coated $VSe_2$ composite material ($VSe_2$@CQD).

Figure 1:
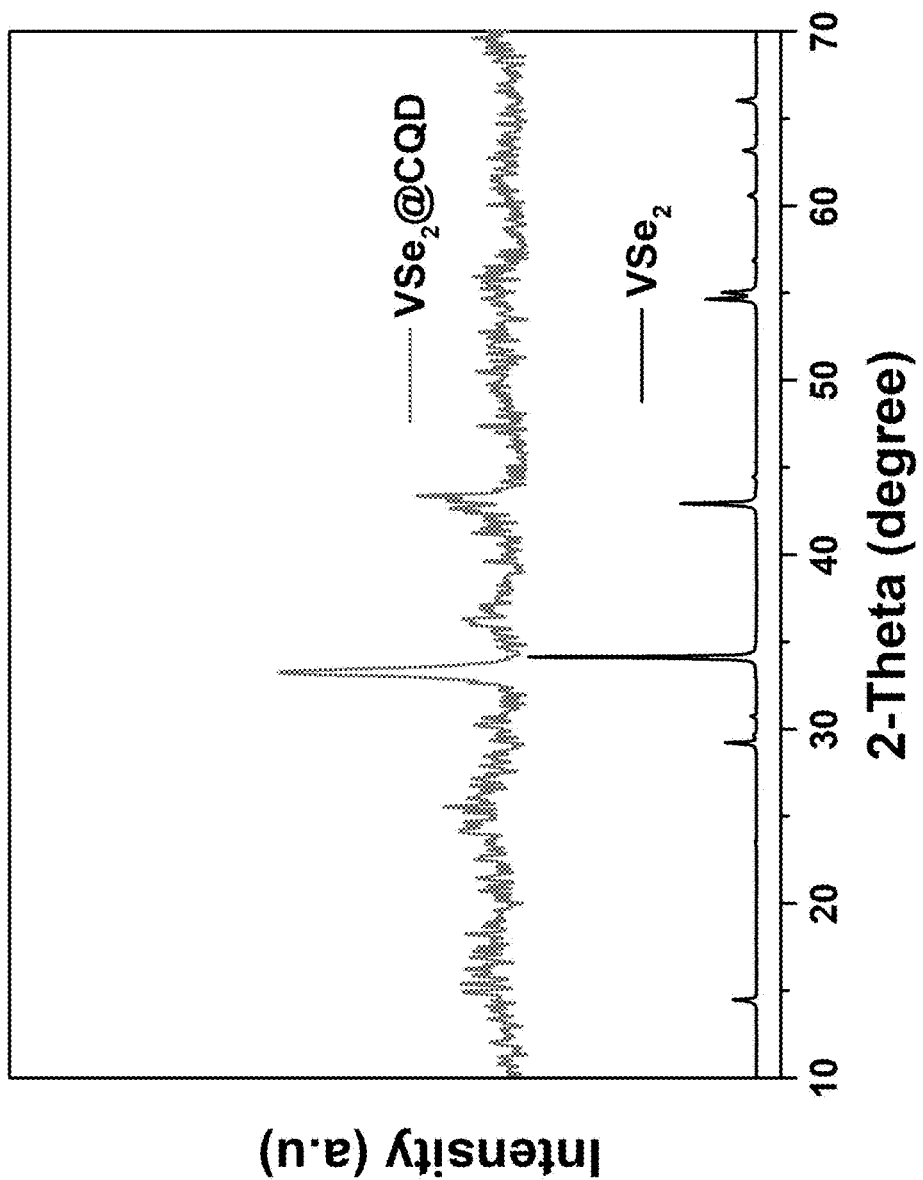
FIG. 1 is an XRD pattern obtained by XRD analysis carried out for a carbon quantum dot/carbon coated $VSe_2$ composite material ($VSe_2$@CQD) and pure $VSe_2$ prepared in embodiment 1 of the present invention.
Figure 2:
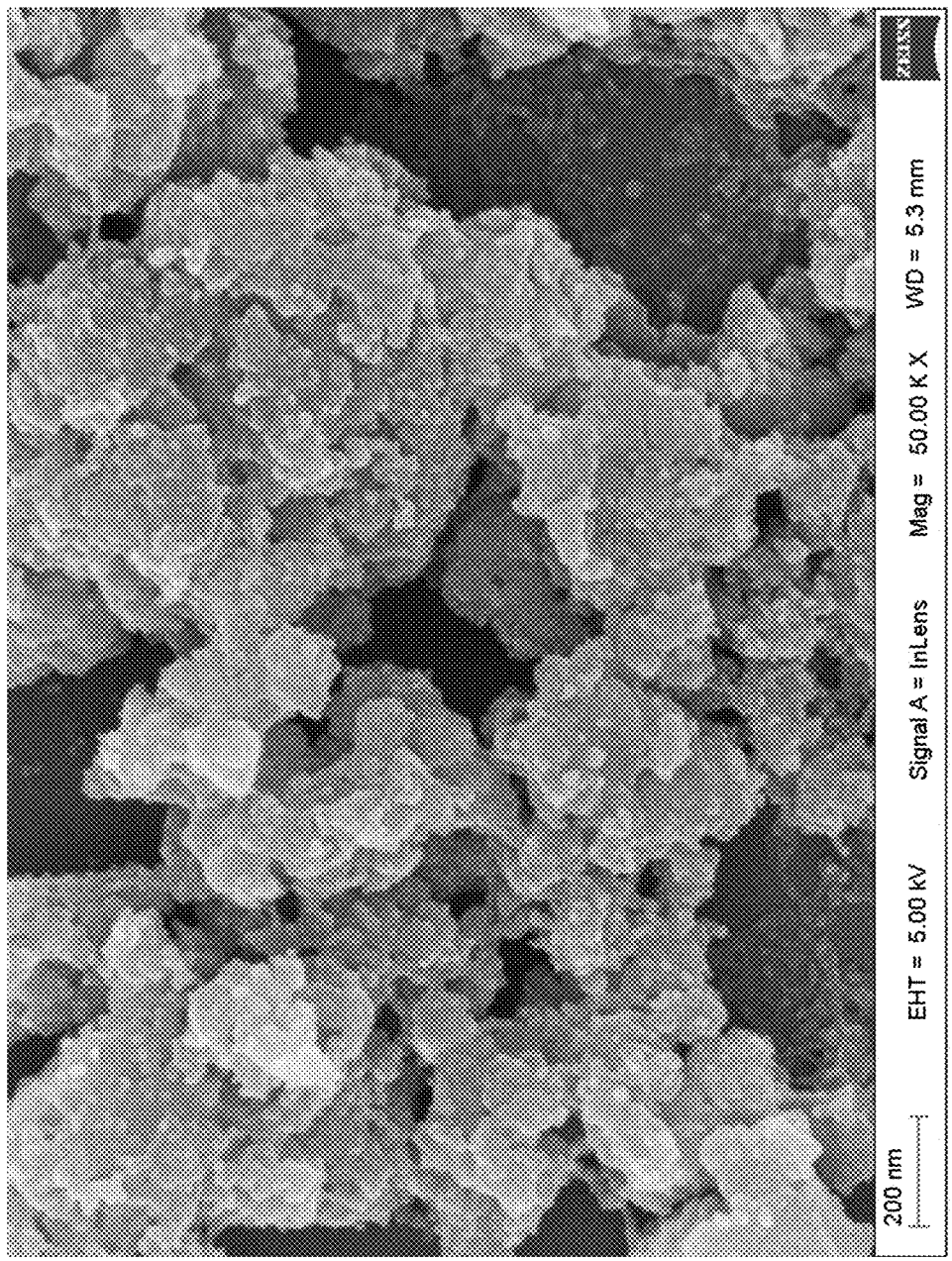
FIG. 2 is an SEM image of the carbon quantum dot/carbon coated $VSe_2$ composite material ($VSe_2$@CQD) prepared in embodiment 1 of the present invention.
Figure 3:
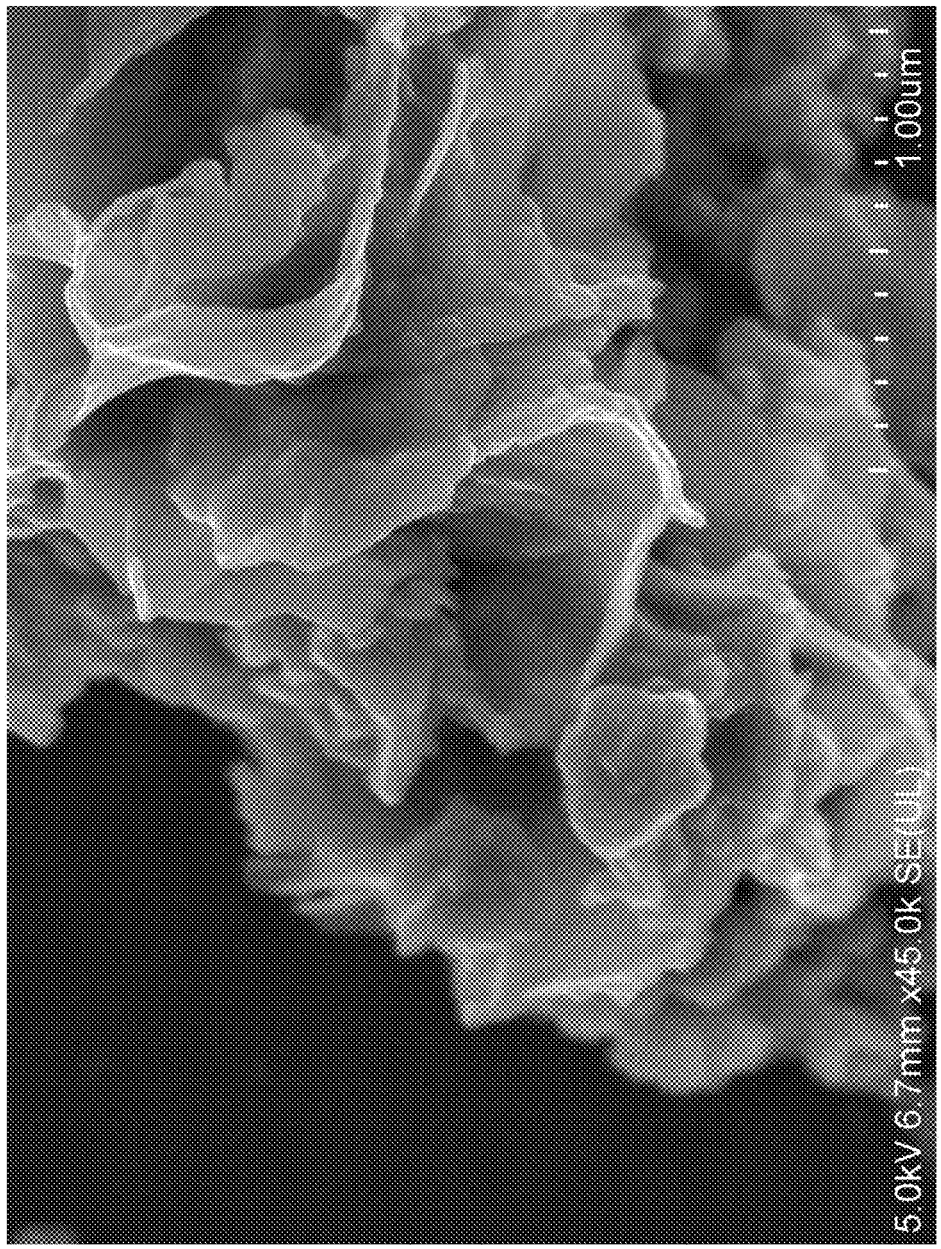
FIG. 3 is an SEM image of a pure laminar $VSe_2$ material prepared in embodiment 1 of the present invention.
Figure 4:
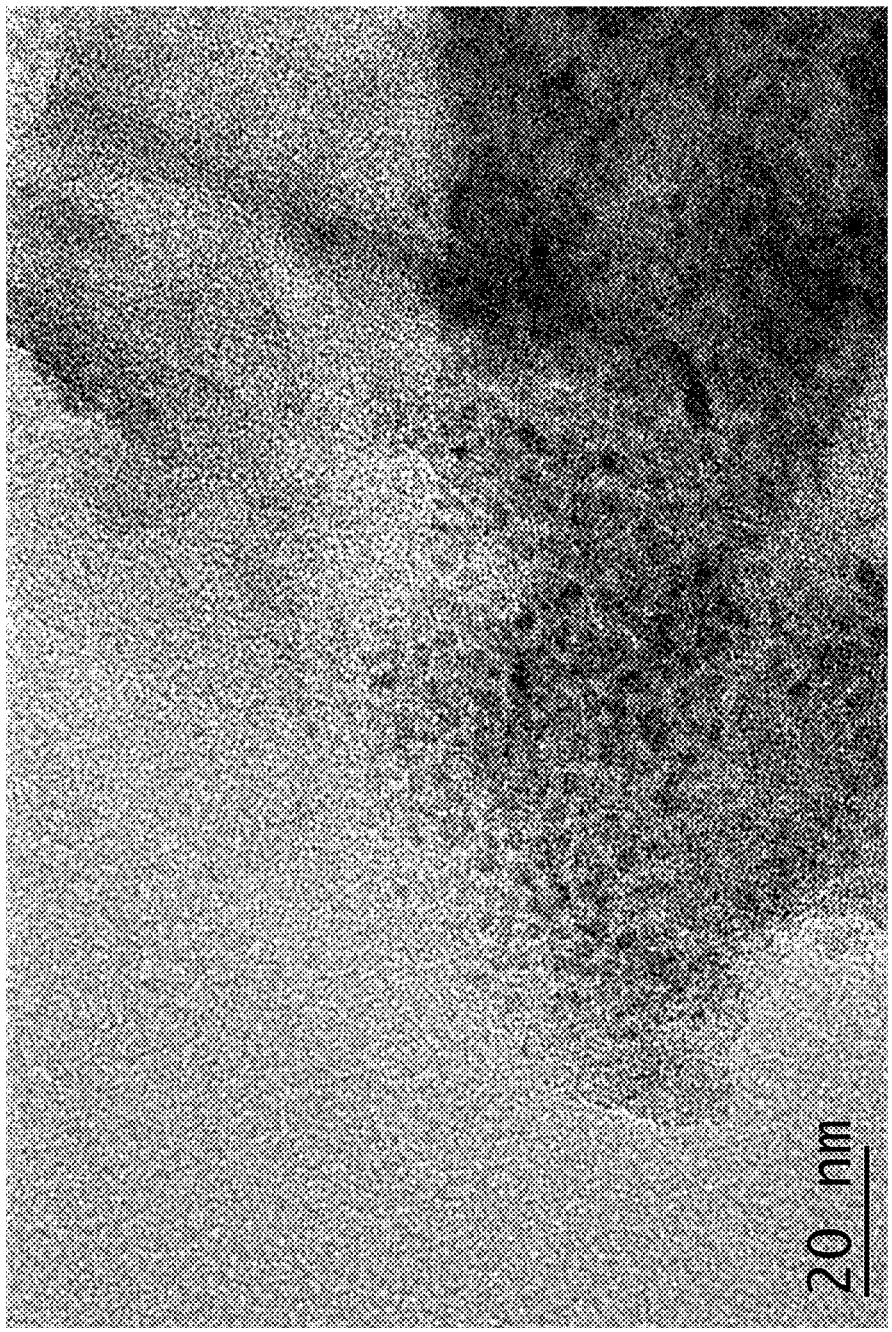
FIG. 4 is a TEM image of the carbon quantum dot/carbon coated $VSe_2$ composite material ($VSe_2$@CQD) prepared in embodiment 1 of the present invention.
Figure 5:
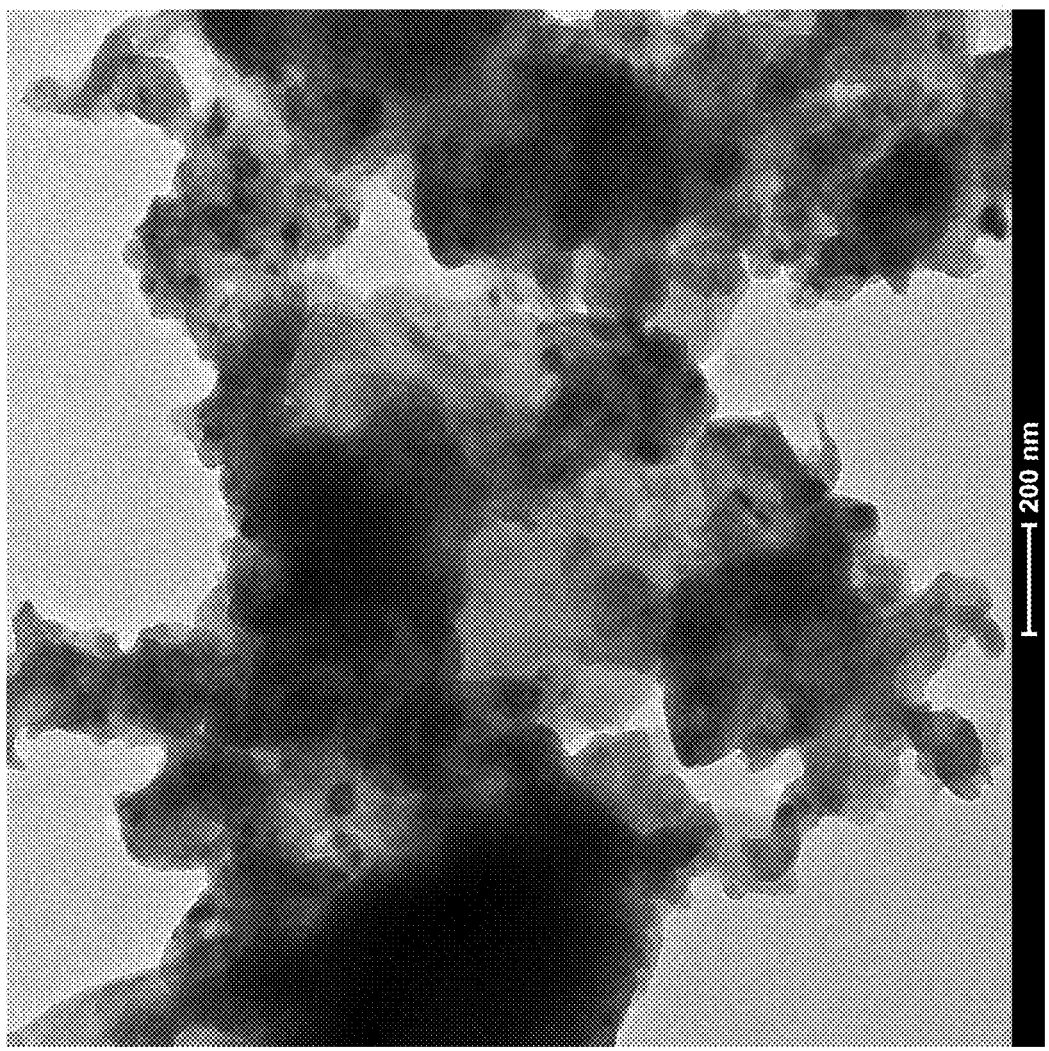
FIG. 5 is a TEM image of the pure laminar $VSe_2$ material prepared in embodiment 1 of the present invention.

XRD analysis and SEM/TEM analysis are carried out for the carbon quantum dot/carbon coated $VSe_2$ composite material ($VSe_2$@CQD) prepared in embodiment 1 of the present invention and a pure laminar $VSe_2$ material obtained in embodiment 1. It can be seen from the XRD pattern that the carbon quantum dot/carbon coated $VSe_2$ composite material and the laminar $VSe_2$ material before the modification have consistent diffraction peaks, which indicates that the carbon quantum dots/carbon coating does not change the phase structure of the laminar $VSe_2$ material. An SEM image of the carbon quantum dot/carbon coated $VSe_2$ composite material ($VSe_2$@CQD) prepared in embodiment 1 of the present invention is as shown in FIG. 2, and an SEM image of the pure laminar $VSe_2$ material used in embodiment 1 is as shown in FIG. 3. It can be seen from the comparison between FIG. 2 and FIG. 3 that after the carbon quantum dot/carbon coating, a laminar microstructure of the material is not changed, but the surface is rougher. A TEM image of the carbon quantum dot/carbon coated $VSe_2$ composite material ($VSe_2$@CQD) prepared in embodiment 1 of the present invention is as shown in FIG. 4, and a TEM image of the pure laminar $VSe_2$ material used in embodiment 1 is as shown in FIG. 5. It can be seen from the comparison between FIG. 4 and FIG. 5 that after the carbon quantum dot/carbon coating, a lot of carbon dots/carbon spheres (carbon quantum dots) of 2-5 nm are coated on the laminar $VSe_2$ material, which states that the carbon quantum dots/carbon is successfully coated on the $VSe_2$ material.

The carbon quantum dot/carbon coated $VSe_2$ composite material ($VSe_2$@CQD) prepared in embodiment 1, acetylene black and binder PVDF are dissolved in N-methyl pyrrolidone according to a ratio of 7.5:1.5:1.5 and stirred. Resulting slurry is smeared on a copper foil, which is vacuum dried for 12 h to obtain a positive electrode sheet. Then, a battery is assembled in a glove box fully filled with argon. A positive electrode is carbon quantum dot/carbon coated $VSe_2$ composite material ($VSe_2$@CQD), a negative electrode is a potassium sheet, a diaphragm is glass fibers, and electrolyte is $KPF_6$. Electrochemical performance test is performed for an assembled button battery.

Figure 6:
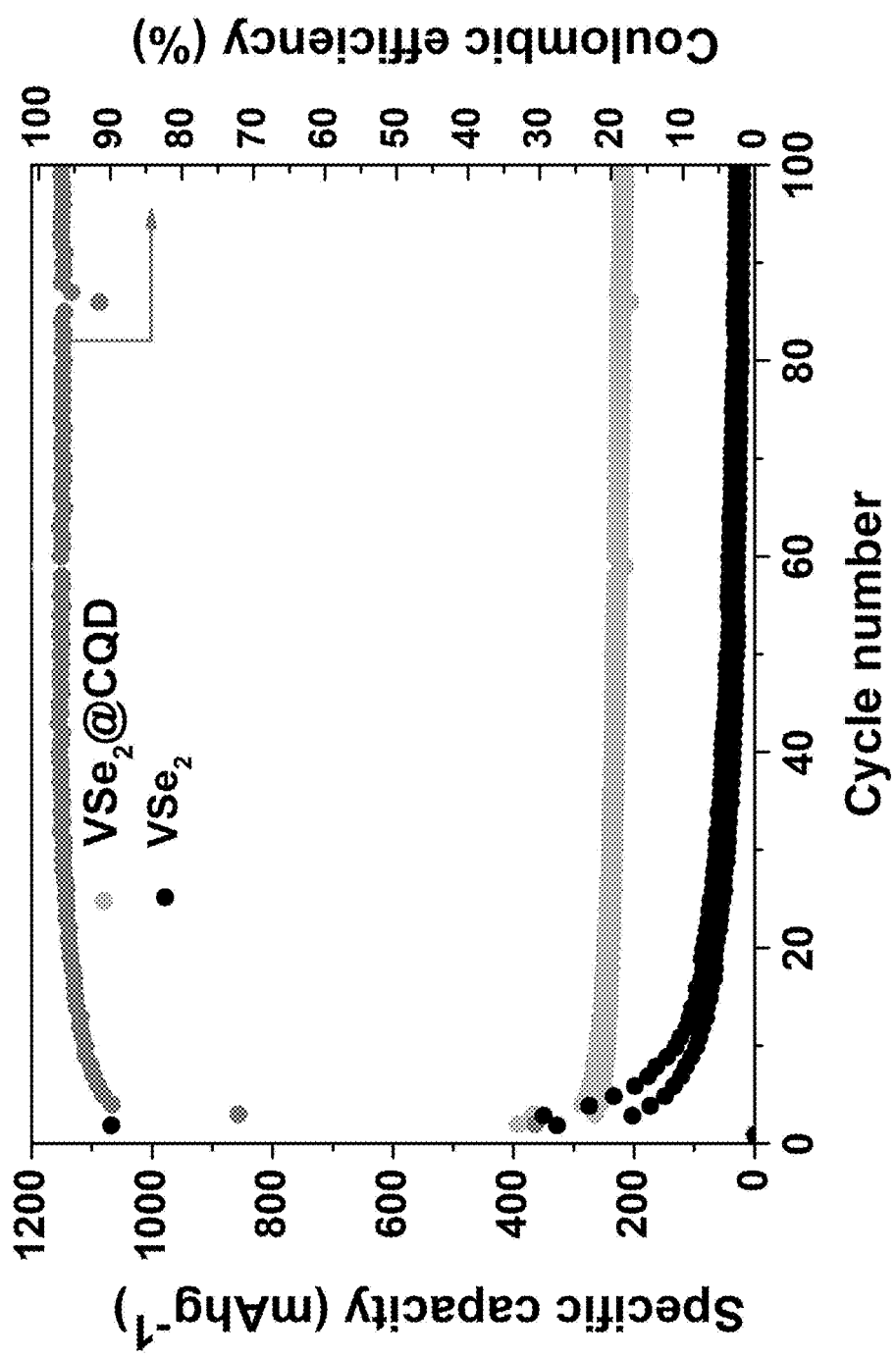
FIG. 6 is a charge-discharge cycle performance diagram of a button battery made of the carbon quantum dot/carbon coated $VSe_2$ composite material ($VSe_2$@CQD) prepared in embodiment 1 and pure laminar $VSe_2$ material prepared in comparative example 1 at a current density of 100 $mAg^{-1}$.

FIG. 6 is a charge-discharge cycle performance diagram of a button battery made of the carbon quantum dot/carbon coated $VSe_2$ composite material ($VSe_2$@CQD) prepared in embodiment 1 and the pure laminar $VSe_2$ material prepared in comparative example 1 at a current density of 100 $mAg^{-1}$. It can be seen from FIG. 6 that the capacity of the carbon quantum dot/carbon coated $VSe_2$ composite material ($VSe_2$@CQD) prepared in embodiment 1 is 221.0 $mAhg^{-1}$ after 100 cycles, but the capacity of the pure laminar $VSe_2$ material is only 30.8 $mAhg^{-1}$ after 100 cycles. The above results show that the reversible capacity and cycle stability of $VSe_2$ coated with carbon dots/carbon can be effectively improved.

Figure 7:
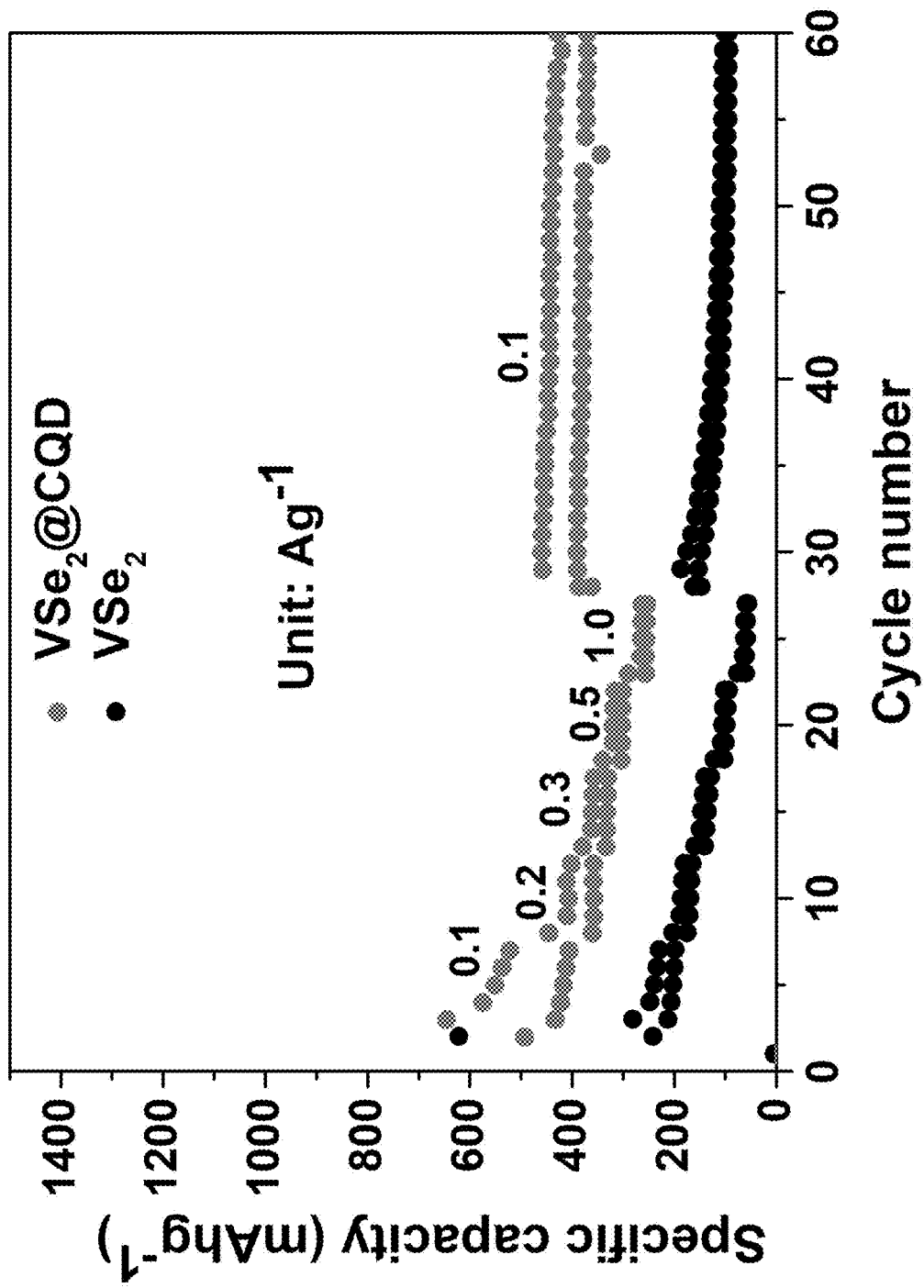
FIG. 7 is a charge-discharge rate performance diagram of the button battery made of carbon quantum dot/carbon coated $VSe_2$ composite material ($VSe_2$@CQD) prepared in embodiment 1 and the pure laminar $VSe_2$ material prepared in comparative example 1 at a current density of 100-1000 $mAg^{-1}$.

FIG. 7 is a charge-discharge rate performance diagram of the button battery made of the carbon quantum dot/carbon coated $VSe_2$ composite material ($VSe_2$@CQD) prepared in embodiment 1 and the pure laminar $VSe_2$ material prepared in comparative example 1 at a current density of 100-1000 $mAg^{-1}$. It can be seen from FIG. 7 that the reversible capacities of the carbon quantum dot/carbon coated $VSe_2$ composite material ($VSe_2$@CQD) prepared in embodiment 1 are 405.3, 357.0, 330.7, 301.6 and 253.8 $mAhg^{-1}$ at current densities of 100, 200, 300, 500 and 1000 $mAg^{-1}$. However, the capacities of the pure laminar $VSe_2$ material at the same rate and current densities are 196.8, 164.9, 130.2, 93.8 and 55.8 $mAhg^{-1}$ The above results show that the capacity of $VSe_2$ coated with carbon quantum dots/carbon can be effectively improved.

Figure 8:
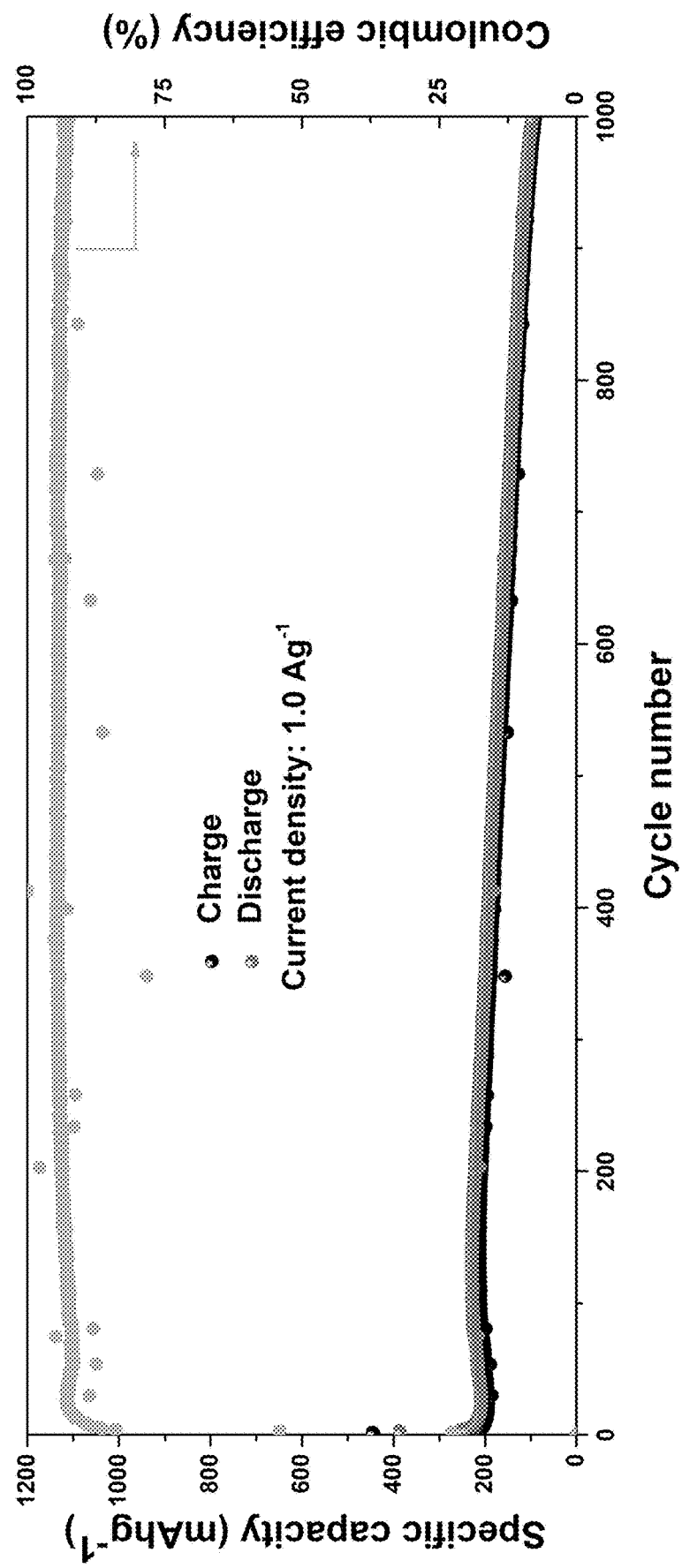
FIG. 8 is a charge-discharge long-cycle performance diagram of the button battery made of the carbon quantum dot/carbon coated $VSe_2$ composite material ($VSe_2$@CQD) prepared in embodiment 1 and the pure laminar $VSe_2$ material prepared in comparative example 1 at a current density of 500 $mAg^{-1}$.
Figure 9:
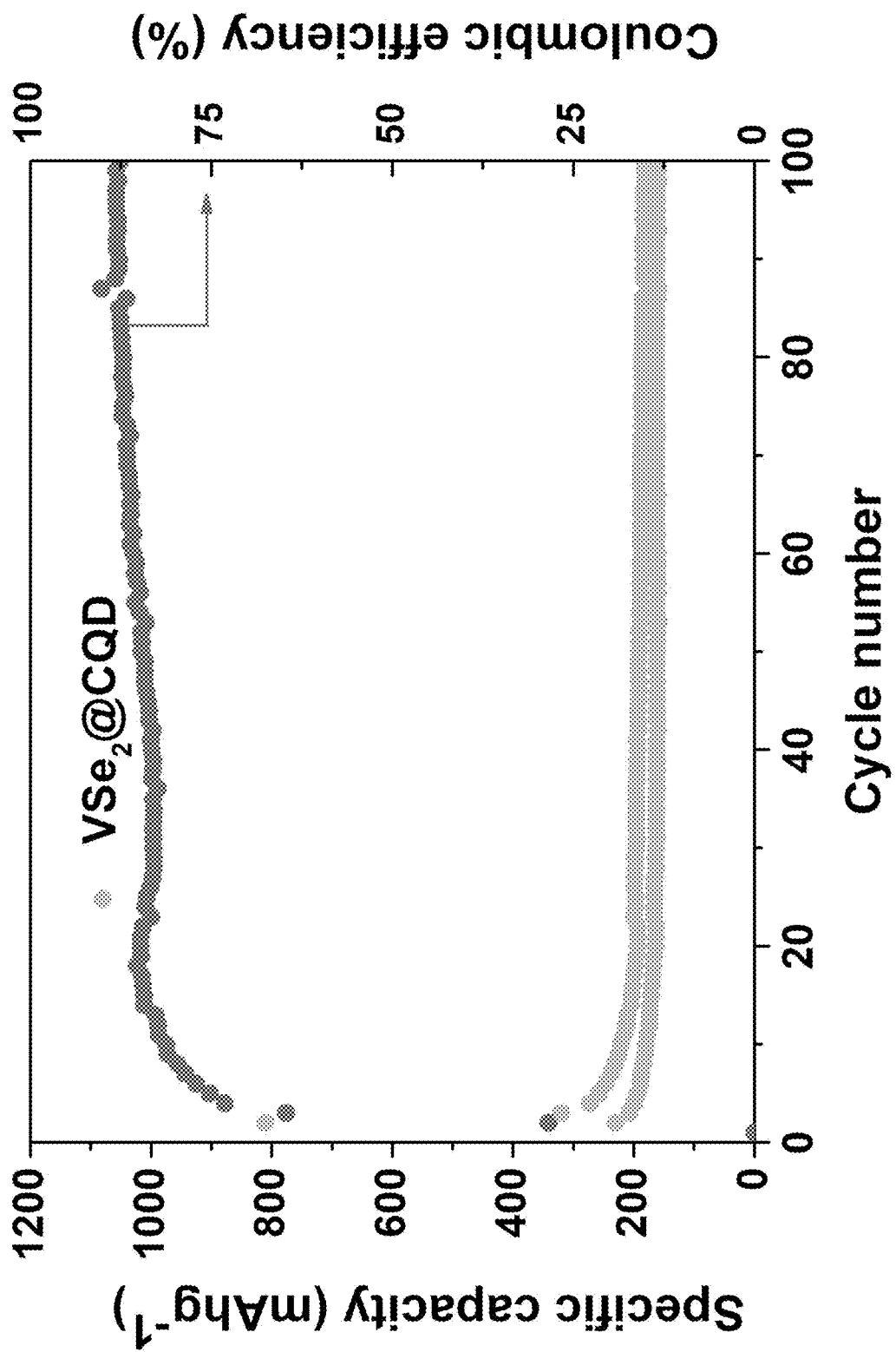
FIG. 9 is a charge-discharge cycle performance diagram of a button battery made of a carbon quantum dot/carbon coated $VSe_2$ composite material ($VSe_2$@CQD) prepared in embodiment 2 at a current density of 100 $mAg^{-1}$.
Figure 10:
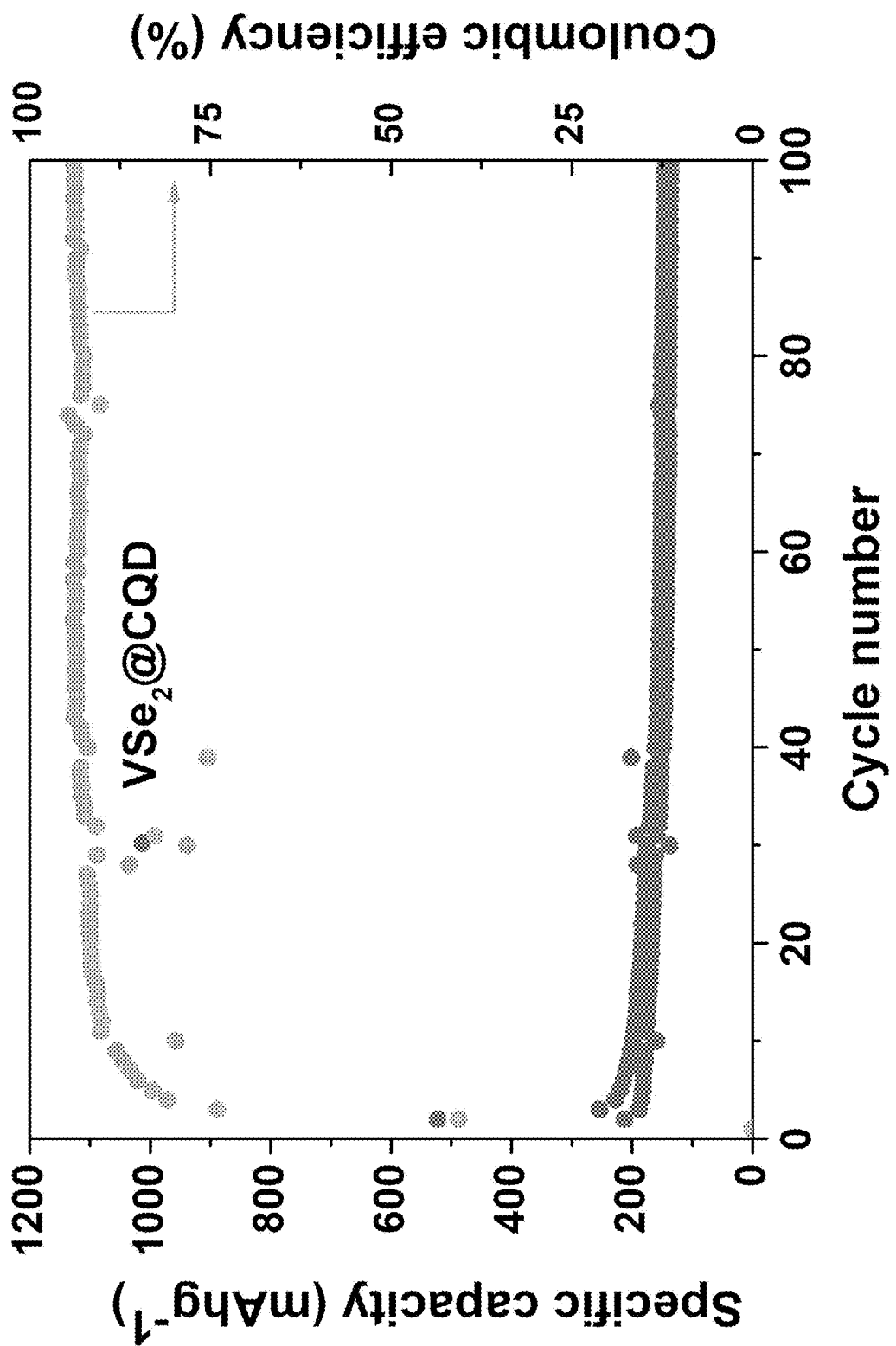
FIG. 10 is a charge-discharge cycle performance diagram of a button battery made of a carbon quantum dot/carbon coated $VSe_2$ composite material ($VSe_2$@CQD) prepared in embodiment 3 at a current density of 100 $mAg^{-1}$.

FIG. 8 is a charge-discharge long-cycle performance diagram of the button battery made of the carbon quantum dot/carbon coated $VSe_2$ composite material ($VSe_2$@CQD) prepared in embodiment 1 at a current density of 500 $mAg^{-1}$. It can be seen from FIG. 8 that the capacity of the carbon quantum dot/carbon coated $VSe_2$ composite material ($VSe_2$@CQD) prepared in embodiment 1 is kept at 100.1 $mAhg^{-1}$ after 1000 cycles, and it can be seen that the long-cycle stability and structural stability of $VSe_2$ coated with the carbon quantum dots/carbon can be effectively improved.

Embodiment 2

1). Vanadium dioxide and selenium dioxide are weighed and dissolved in N-methyl pyrazolone solvent to prepare a solution with a concentration of 1.5 mol/L, and the solution is stirred for 0.5 h to obtain a brownish gray solution;

2). Formic acid is added into the salt solution obtained in the step 1), and continuously stirred for 0.5 h to obtain a mixed solution;

3). The mixed solution obtained in the step 2) is transferred into a polytetrafluoroethylene lined high-pressure hydrothermal reaction kettle, and the temperature is kept at 200° C. for 24 h;

4). After the solution obtained in the step 3) is cooled, the solution is centrifuged repeatedly with deionized water and absolute ethyl alcohol at a rate of 10,000 r/m, and the solution is removed to obtain black precipitates;

5). The black precipitates obtained in the step 4) are dried at 80° C. for 24 h to obtain black powder;

6). An organic compound cellulose acetate butyrate is washed in an alkaline mixed solution and filtered for 3 times at a low temperature of −15° C., and filtered white precipitates are washed with water and absolute ethyl alcohol for 3 times until the solution is neutral;

7). The white precipitates obtained in the step 6) are dried at 80° C. for 24 h to obtain white powder;

8). The black powder obtained in the step 5) and the white powder obtained in the step 6) are weighed in a mass ratio of 1:3, and the powder is dissolved in organic solvent, and stirred for 24 h;

9). The solution obtained in the step 8) is dried at 100° C. for 24 h to obtain brown colloid; and 10). The brown colloid obtained in the step 9) is heated from 25° C. to 220° C. at 5° C./min in an inert atmosphere, the temperature is kept for 2 h, then the temperature increases to 750° C. at 5° C./min to be kept for 2 h, and the colloid is naturally cooled to the room temperature to obtain the carbon quantum dot/carbon coated $VSe_2$ composite material ($VSe_2$@CQD).

The carbon quantum dot/carbon coated $VSe_2$ composite material ($VSe_2$@CQD) prepared in embodiment 2, acetylene black and binder PVDF are dissolved in N-methyl pyrrolidone according to a ratio of 7.5:1.5:1.5 and stirred. Resulting slurry is smeared on a copper foil, which is vacuum dried for 12 h to obtain a positive electrode sheet. Then, the battery is assembled in a glove box fully filled with argon. A positive electrode is carbon quantum dot/carbon coated $VSe_2$ composite material ($VSe_2$@CQD), a negative electrode is a potassium sheet, a diaphragm is glass fibers, and electrolyte is $KPF_6$. The electrochemical performance test is carried out at a voltage ranged from 0.01 to 3.0 V at 25° C. The result shows that the carbon quantum dot/carbon coated $VSe_2$ composite material ($VSe_2$@CQD) prepared in embodiment 2 has excellent rate performance and cycle stability.

Embodiment 3

1). Vanadium dioxide and selenium dioxide are weighed and dissolved in N-methyl pyrazolone solvent to prepare a solution with a concentration of 1.5 mol/L, and the solution is stirred for 0.5 h to obtain a brownish gray solution;

2). Formic acid is added into the salt solution obtained in the step 1), and continuously stirred for 0.5 h to obtain a mixed solution;

3). The mixed solution obtained in the step 2) is transferred into a polytetrafluoroethylene lined high-pressure hydrothermal reaction kettle, and the temperature is kept at 200° C. for 24 h;

4). After the solution obtained in the step 3) is cooled, the solution is centrifuged repeatedly with deionized water and absolute ethyl alcohol at a rate of 10,000 r/m, and the solution is removed to obtain black precipitates;

5). The black precipitates obtained in the step 4) are dried at 80° C. for 24 h to obtain black powder;

6). An organic compound cellulose acetate butyrate is washed in an alkaline mixed solution and filtered for 3 times at a low temperature of −15° C., and filtered white precipitates are washed with water and absolute ethyl alcohol for 3 times until the solution is neutral;

7). The white precipitates obtained in the step 6) are dried at 80° C. for 24 h to obtain white powder;

8). The black powder obtained in the step 5) and the white powder obtained in the step 6) are weighed in a mass ratio of 1:10, and the powder is dissolved in organic solvent, and stirred for 24 h;

9). The solution obtained in the step 8) is dried at 100° C. for 24 h to obtain brown colloid; and 10). The brown colloid obtained in the step 9) is heated from 25° C. to 220° C. at 5° C./min in an inert atmosphere, the temperature is kept for 2 h, then the temperature increases to 750° C. at 5° C./min to be kept for 2 h, and the colloid is naturally cooled to the room temperature to obtain the carbon quantum dot/carbon coated $VSe_2$ composite material ($VSe_2$@CQD).

The carbon quantum dot/carbon coated $VSe_2$ composite material ($VSe_2$@CQD) prepared in embodiment 3, acetylene black and binder PVDF are dissolved in N-methyl pyrrolidone according to a ratio of 7.5:1.5:1.5 and stirred. Resulting slurry is smeared on a copper foil, which is vacuum dried for 12 h to obtain a positive electrode sheet. Then, the battery is assembled in a glove box fully filled with argon. A positive electrode is carbon quantum dot/carbon coated $VSe_2$ composite material ($VSe_2$@CQD), a negative electrode is a potassium sheet, a diaphragm is glass fibers, and electrolyte is $KPF_6$. The electrochemical performance test is carried out at a voltage ranged from 0.01 to 3.0 V at 25° C. The result shows that the carbon quantum dot/carbon coated $VSe_2$ composite material ($VSe_2$@CQD) prepared in embodiment 3 has excellent rate performance and cycle stability.

Embodiment 4

1). Vanadium dioxide and selenium dioxide are weighed and dissolved in deionized water to prepare a solution with a concentration of 1.5 mol/L, and the solution is stirred for 0.5 h to obtain a brownish gray solution;

2). Formic acid is added into the salt solution obtained in the step 1), and continuously stirred for 0.5 h to obtain a mixed solution;

3). The mixed solution obtained in the step 2) is transferred into a polytetrafluoroethylene lined high-pressure hydrothermal reaction kettle, and the temperature is kept at 180° C. for 30 h;

4). After the solution obtained in the step 3) is cooled, the solution is centrifuged repeatedly with deionized water and absolute ethyl alcohol at a rate of 10,000 r/m, and the solution is removed to obtain black precipitates;

5). The black precipitates obtained in the step 4) are dried at 80° C. for 24 h to obtain black powder;

6). An organic compound cellulose acetate butyrate is washed in an alkaline mixed solution and filtered for 3 times at a low temperature of −15° C., and filtered white precipitates are washed with water and absolute ethyl alcohol for 3 times until the solution is neutral;

7). The white precipitates obtained in the step 6) are dried at 80° C. for 24 h to obtain white powder;

8). The black powder obtained in the step 5) and the white powder obtained in the step 6) are weighed in a mass ratio of 1:6, and the powder is dissolved in the organic solvent of N-methyl pyrazolone, and stirred for 24 h;

9). The solution obtained in the step 8) is dried at 100° C. for 24 h to obtain brown colloid; and 10). The brown colloid obtained in the step 9) is heated from 25° C. to 200° C. at 5° C./min in an inert atmosphere, the temperature is kept for 2 h, then the temperature increases to 800° C. at 5° C./min to be kept for 2 h, and the colloid is naturally cooled to the room temperature to obtain the carbon quantum dot/carbon coated $VSe_2$ composite material ($VSe_2$@CQD).

The carbon quantum dot/carbon coated $VSe_2$ composite material ($VSe_2$@CQD) prepared in embodiment 4, acetylene black and binder PVDF are dissolved in N-methyl pyrrolidone according to a ratio of 7.5:1.5:1.5 and stirred. Resulting slurry is smeared on a copper foil, which is vacuum dried for 12 h to obtain a positive electrode sheet. Then, the battery is assembled in a glove box fully filled with argon. A positive electrode is carbon quantum dot/carbon coated $VSe_2$ composite material ($VSe_2$@CQD), a negative electrode is a potassium sheet, a diaphragm is glass fibers, and electrolyte is $KPF_6$. The electrochemical performance test is carried out at a voltage ranged from 0.01 to 3.0 V at 25° C. The result shows that the carbon quantum dot/carbon coated $VSe_2$ composite material ($VSe_2$@CQD) prepared in embodiment 4 has excellent rate performance and cycle stability.

Embodiment 5

1). Vanadium dioxide and selenium dioxide are weighed and dissolved in deionized water to prepare a solution with a concentration of 1.0 mol/L, and the solution is stirred for 0.5 h to obtain a brownish gray solution;

2). Formic acid is added into the salt solution obtained in the step 1), and continuously stirred for 0.5 h to obtain a mixed solution;

3). The mixed solution obtained in the step 2) is transferred into a polytetrafluoroethylene lined high-pressure hydrothermal reaction kettle, and the temperature is kept at 200° C. for 24 h;

4). After the solution obtained in the step 3) is cooled, the solution is centrifuged repeatedly with deionized water and absolute ethyl alcohol at a rate of 8,000 r/m, and the solution is removed to obtain black precipitates;

5). The black precipitates obtained in the step 4) are dried at 80° C. for 24 h to obtain black powder;

6). An organic compound cellulose acetate butyrate is washed in an alkaline mixed solution and filtered for 3 times at a low temperature of −15° C., and filtered white precipitates are washed with water and absolute ethyl alcohol for 3 times until the solution is neutral;

7). The white precipitates obtained in the step 6) are dried at 80° C. for 24 h to obtain white powder;

8). The black powder obtained in the step 5) and the white powder obtained in the step 6) are weighed in a mass ratio of 1:10, and the powder is dissolved in the organic solvent of N-methyl pyrazolone, and stirred for 24 h;

9). The solution obtained in the step 8) is dried at 100° C. for 24 h to obtain brown colloid; and 10). The brown colloid obtained in the step 9) is heated from 25° C. to 220° C. at 5° C./min in an inert atmosphere, the temperature is kept for 2 h, then the temperature increases to 750° C. at 5° C./min to be kept for 2 h, and the colloid is naturally cooled to the room temperature to obtain the carbon quantum dot/carbon coated $VSe_2$ composite material ($VSe_2$@CQD).

The carbon quantum dot/carbon coated $VSe_2$ composite material ($VSe_2$@CQD) prepared in embodiment 5, acetylene black and binder PVDF are dissolved in N-methyl pyrrolidone according to a ratio of 7.5:1.5:1.5 and stirred. Resulting slurry is smeared on a copper foil, which is vacuum dried for 12 h to obtain a positive electrode sheet. Then, the battery is assembled in a glove box fully filled with argon. A positive electrode is carbon quantum dot/carbon coated $VSe_2$ composite material ($VSe_2$@CQD), a negative electrode is a potassium sheet, a diaphragm is glass fibers, and electrolyte is $KPF_6$. The electrochemical performance test is carried out at a voltage ranged from 0.01 to 3.0 V at 25° C. The result shows that the carbon quantum dot/carbon coated $VSe_2$ composite material ($VSe_2$@CQD) prepared in embodiment 5 has excellent rate performance and cycle stability.

We claim:

1. A preparation method of a carbon quantum dot/carbon coated $VSe_2$ composite material ($VSe_2$@CQD), comprising the following steps:
   1) weighing vanadium oxide and selenium oxide, dissolving in water or organic solvent to prepare a solution with a concentration of 0.5-2 mol/L, and stirring for 0.5 h to obtain a brownish gray solution;
   2) adding organic acid into the salt solution obtained in the step 1), and continuously stirring for 0.5 h to obtain a mixed solution;
   3) transferring the mixed solution obtained in the step 2) into a polytetrafluoroethylene lined high-pressure hydrothermal reaction kettle, and keeping the temperature at 150-220° C. for 15-30 h;
   4) after the solution obtained in the step 3) is cooled, repeatedly centrifuging the solution with deionized water and absolute ethyl alcohol at a rate of 5,000-10,000 r/m, and removing the solution to obtain black precipitates;
   5) drying the black precipitates obtained in the step 4) at 50-120° C. for 12-24 h to obtain black powder;
   6) washing an organic compound cellulose acetate butyrate in an alkaline mixed solution and filtering for 3-5 times at a low temperature of −20 to 0° C., and washing the filtered white precipitates with water and absolute ethyl alcohol for 3-5 times until the solution is neutral;
   7) drying the white precipitates obtained in the step 6) at 50-100° C. for 12-24 h to obtain white powder;
   8) weighing the black powder obtained in the step 5) and the white powder obtained in the step 6) in a mass ratio of 1:(3-10), dissolving the powder in organic solvent, and stirring for 12-24 h;
   9) drying the solution obtained in the step 8) at 50-120° C. for 12-24 h to obtain brown colloid;
   10) heating the brown colloid obtained in the step 9) from 25° C. to 180-250° C. at 1-5° C./min in an inert atmosphere, keeping the temperature for 1-5 h, then heating to 600-950° C. at 1-5° C./min, keeping the temperature for 2-5 h, and naturally cooling to the room temperature to obtain the carbon quantum dot/carbon coated $VSe_2$ composite material ($VSe_2$@CQD).

2. The preparation method of the carbon quantum dot/carbon coated $VSe_2$ composite material ($VSe_2$@CQD) according to claim 1, wherein the mass fraction of $VSe_2$ in carbon quantum dot/carbon coated $VSe_2$ composite material ($VSe_2$@CQD) is 60%-70%, and the mass fraction of carbon quantum dots/carbon is 30%-40%.

3. The preparation method of the carbon quantum dot/carbon coated $VSe_2$ composite material ($VSe_2$@CQD) according to claim 1, wherein in the step 1), the vanadium oxide is vanadium dioxide; the selenium oxide is selenium dioxide; and the solvent is one of deionized water or N-methyl pyrrolidone.

4. The preparation method of the carbon quantum dot/carbon coated $VSe_2$ composite material ($VSe_2$@CQD) according to claim 1, wherein in the step 2), the organic acid is formic acid.

5. The preparation method of the carbon quantum dot/carbon coated $VSe_2$ composite material ($VSe_2$@CQD) according to claim 1, wherein in the step 3), the keeping temperature is preferably controlled at 180-220° C., and the temperature keeping time is preferably controlled at 20-28 h.

6. The preparation method of the carbon quantum dot/carbon coated $VSe_2$ composite material ($VSe_2$@CQD) according to claim 1, wherein in the step 4), the centrifuging rate is preferably controlled at 8,000-10,000 r/m.

7. The preparation method of the carbon quantum dot/carbon coated $VSe_2$ composite material ($VSe_2$@CQD) according to claim 1, wherein in the step 5), the drying temperature is preferably controlled at 80-100° C., and the temperature keeping time is preferably controlled at 18-24 h.

8. The preparation method of the carbon quantum dot/carbon coated $VSe_2$ composite material ($VSe_2$@CQD) according to claim 1, wherein in the step 6), the alkaline mixed solution is a 5-10% sodium hydroxide/8-15% urea mixed aqueous solution, and the temperature is preferably controlled at −20 to −15° C.

9. The preparation method of the carbon quantum dot/carbon coated $VSe_2$ composite material ($VSe_2$@CQD) according to claim 1, wherein in the step 7), the drying temperature is preferably controlled at 80-100° C., and the temperature keeping time is preferably controlled at 18-24 h.

10. The preparation method of the carbon quantum dot/carbon coated $VSe_2$ composite material ($VSe_2$@CQD) according to claim 1, wherein in the step 8), a mass ratio of the black powder obtained in the step 5) to the white powder obtained in the step 6) is preferably controlled at 1:(4-8), the organic solvent is preferably N-methyl pyrrolidone, and the stirring time is preferably 20-24 h.

11. The preparation method of the carbon quantum dot/carbon coated $VSe_2$ composite material ($VSe_2$@CQD) according to claim 1, wherein in the step 9), the drying temperature is preferably controlled at 80-100° C., and the temperature keeping time is preferably controlled at 18-24 h.

12. The preparation method of the carbon quantum dot/carbon coated $VSe_2$ composite material ($VSe_2$@CQD) according to claim 1, wherein in the step 10), the inert atmosphere is one or more of nitrogen or argon; the heating rate is preferably 5° C./min, the first keeping temperature is preferably 200-220° C., and the temperature keeping time is preferably 2-3 h; the second keeping temperature is preferably 700-800° C., and the temperature keeping time is preferably 2-3 h.

* * * * *